(12) United States Patent
Hirotsu et al.

(10) Patent No.: US 11,449,091 B2
(45) Date of Patent: Sep. 20, 2022

(54) ELECTRONIC CONTROL DEVICE (71) Applicant: Hitachi Automotive Systems, Ltd., Hitachinaka (JP)

(72) Inventors: Teppei Hirotsu, Tokyo (JP); Hiroshi Iwasawa, Tokyo (JP); Atsushi Arata, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 489 days.

(21) Appl. No.: 16/608,567

(22) PCT Filed: Apr. 6, 2018

(86) PCT No.: PCT/JP2018/014678
§ 371 (c)(1),
(2) Date: Oct. 25, 2019

(87) PCT Pub. No.: WO2018/225366
PCT Pub. Date: Dec. 13, 2018

(65) Prior Publication Data
US 2021/0109564 A1 Apr. 15, 2021

(30) Foreign Application Priority Data
Jun. 8, 2017 (JP) .............................. JP2017-113224

(51) Int. Cl.
*G09G 5/00* (2006.01)
*G06F 1/12* (2006.01)
*B60W 50/06* (2006.01)
*G06F 1/04* (2006.01)
*G06F 1/3296* (2019.01)

(52) U.S. Cl.
CPC .............. *G06F 1/12* (2013.01); *B60W 50/06* (2013.01); *G06F 1/04* (2013.01); *G06F 1/3296* (2013.01)

(58) Field of Classification Search
CPC . G06F 1/12; G06F 1/28; G06F 1/3296; G06F 1/324; G06F 1/3228; B60W 50/06
USPC .......................................................... 345/204
See application file for complete search history.

(56) References Cited

U.S. PATENT DOCUMENTS

2004/0230347 A1 11/2004 Sakurai
2008/0112438 A1* 5/2008 Ying ....................... H04L 7/005
370/505

(Continued)

FOREIGN PATENT DOCUMENTS

JP 2002-303201 A 10/2002
JP 2004-339977 A 12/2004
(Continued)

OTHER PUBLICATIONS

International Search Report with English translation and Written Opinion issued in corresponding application No. PCT/JP2018/014678 dated Jul. 17, 2018.

*Primary Examiner* — Jennifer T Nguyen
(74) *Attorney, Agent, or Firm* — Foley & Lardner LLP (57) ABSTRACT

There is provided a technology capable of synchronizing a plurality of timers with a simple circuit configuration in an electronic control unit that controls a vehicle. An electronic control unit according to the present invention concatenates a second timer value as the most significant bit of a first timer value reset by a synchronization signal, and counts up the second timer value by the synchronization signal.

7 Claims, 6 Drawing Sheets

(56) References Cited

U.S. PATENT DOCUMENTS

| | | | |
|---|---|---|---|
| 2012/0166880 A1* | 6/2012 | Greb | G06F 11/002 714/E11.178 |
| 2014/0085673 A1 | 3/2014 | Hirayama | |
| 2014/0211905 A1* | 7/2014 | Chuang | G01K 1/00 377/25 |
| 2017/0264423 A1 | 9/2017 | Hirotsu | |
| 2018/0219872 A1 | 8/2018 | Sugashima | |

FOREIGN PATENT DOCUMENTS

| | | |
|---|---|---|
| JP | 2014-066950 A | 4/2014 |
| JP | 2017-033055 A | 2/2017 |
| JP | 2017-038365 A | 2/2017 |
| WO | WO2016/093055 A1 | 6/2016 |

* cited by examiner

ELECTRONIC CONTROL DEVICE

TECHNICAL FIELD

The present invention relates to an electronic control unit that controls an operation of a vehicle.

BACKGROUND ART

In recent years, vehicle control has become increasingly complex, and the functions of an electronic control unit (ECU) and the number of inputs/outputs (I/O) has increased. In order to resolve the complexity of the ECU, a configuration in which sensor data acquisition and driver functions performed by a single ECU in the related art are arranged so as to be distributed as a sensor ECU and a driver ECU, and equivalent functions are realized by connecting the ECUs to a network has been suggested.

It is important to synchronize the ECU with high accuracy in order to realize high-accuracy control in such a distributed architecture. In the following PTL 1, a first timer that counts up by an internal clock is provided, a first timer value based on a synchronization signal input from the outside is stored, and the first timer value is corrected by using the stored value. In this manner, it is possible to synchronize the ECUs with high accuracy with a simple circuit.

The following PTL 2 discloses a technology for "realizing timing synchronization between the ECUs with a simple circuit in an electronic control unit constituted by a driver ECU, a sensor ECU, and an integration ECU which are connected to a network". Specifically, PTL 2 discloses a technology of "the electronic control unit includes a driver ECU that drives various loads for vehicle control, a sensor ECU that samples various sensor signals, and an integration ECU that is connected to the driver ECU and the sensor ECU via a network, and calculates command values for various loads by using various sensor data. The driver ECU includes an internal timer D for timing generation, the sensor ECU includes an internal timer S for timing generation, and the integration ECU includes a timer M as a reference of the timer D and the timer S (see ABSTRACT).

As means for solving the problem of "an object is to provide an electronic control unit for a vehicle which includes a driver IC which is capable of reducing the number of wires from a microcomputer and is capable of driving an actuator without including the microcomputer therein, and a driver IC used in the same", PTL 3 discloses a technology of "The microcomputer 1 calculates a control signal for controlling a state of the vehicle based on an input signal from the sensor. The output drivers IC2A and 2B include an output driver 22 that includes power transistors for a plurality of channels, a serial communication interface 23 that performs serial communication with a microcomputer, and timer circuits 20A and 20B that generate pulse width modulation signals and pulse signals, and is constituted by a semiconductor circuit acquired by integrating these components. The timer circuits 20A and 20B generate the pulse width modulation signals and the pulse signals based on a control data signal received from the microcomputer 1 by the serial communication interface 23" (see ABSTRACT).

CITATION LIST

Patent Literature

PTL 1: JP 2017-033055 A
PTL 2: WO2016/093055
PTL 3: JP 2004-339977

SUMMARY OF INVENTION

Technical Problem

The technology described in PTL 1 can synchronize the ECUs with high accuracy for one timer in the ECU. Meanwhile, a plurality of timers is provided in the ECU, and when there is an attempt to similarly synchronize the timers, since correction circuits corresponding to the number of timers are required, a circuit size increases.

The technology described in PTL 2 improves synchronization accuracy by performing correction for synchronization with the reference timer M. Meanwhile, when the ECU includes the plurality of timers, since it is necessary to perform the same correction for the timers, the circuit size increases.

In PTL 3 described above, an output driver 22 is achieved by integrating power transistors for a plurality of channels as described in 0029 of the same literature. That is, the output driver 22 can output drive signals to the plurality of channels. Meanwhile, a timer circuit 20A includes a control register 32 for each channel as described in FIG. 2 and 0034 of the same literature. Therefore, since a circuit such as the control register 32 is required for each channel, the circuit size increases.

The present invention has been made in view of the aforementioned problems, and provides a technology capable of synchronizing a plurality of timers with a simple circuit configuration in an electronic control unit that controls a vehicle.

Solution to Problem

The electronic control unit according to the present invention concatenates the second timer value as the most significant bit of the first timer value reset by the synchronization signal, and counts up the second timer value by the synchronization signal.

Advantageous Effects of Invention

According to the electronic control unit of the present invention, it is possible to generate a plurality of timer values synchronized with high accuracy by the synchronization signal. Further, since it is not necessary to provide a circuit for improving synchronization accuracy for each timer, it is possible to simplify a circuit configuration.

DESCRIPTION OF EMBODIMENTS

Embodiment 1

Figure 1:
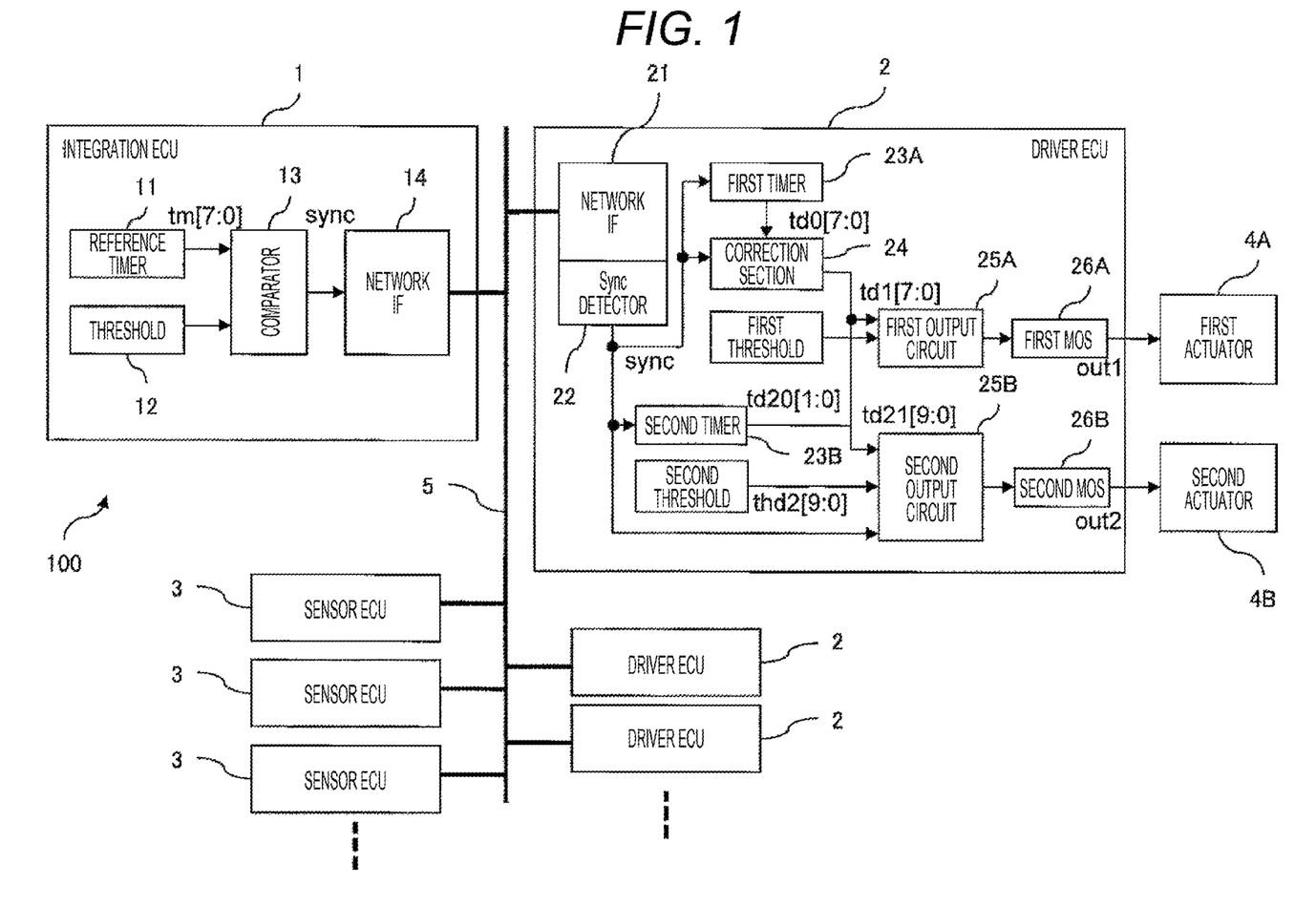
FIG. 1 is a configuration diagram of an in-vehicle network system 100 according to Embodiment 1.

FIG. 1 is a configuration diagram of an in-vehicle network system 100 according to Embodiment 1 of the present invention. The in-vehicle network system 100 is a network system that connects ECUs mounted on a vehicle. The in-vehicle network system 100 includes an integration ECU 1, driver ECUs 2, and sensor ECUs 3. The ECUs are connected via a network 5 and control operations of the vehicle by transmitting and receiving control data to and from each other.

The integration ECU 1 is an ECU that sends commands for other ECUs. The integration ECU 1 includes a reference timer 11, a threshold 12 (a storage circuit that stores the threshold 12), a comparator 13, and a network IF 14. The reference timer 11 counts up a reference timer value (tm[7:0]) by a reference clock internally provided in the integration ECU 1. The comparator 13 outputs a synchronization signal (sync) when the count value of the reference timer 11 matches the threshold 12. The network IF 14 outputs the synchronization signal to the network 5, and each ECU receives the synchronization signal via the network 5. The synchronization signal is used as a reference for synchronizing count values of timers provided in the ECUs.

The integration ECU 1 instructs the driver ECU 2 of first and second thresholds to be described below via the network IF 14 and the network 5. The driver ECU 2 stores the thresholds in an appropriate storage device. The integration ECU 1 similarly instructs the sensor ECU 3 of thresholds, and the sensor ECU 3 stores the thresholds in an appropriate storage device.

The driver ECU 2 is an electronic control unit that controls the operation of the vehicle by driving a first actuator 4A and a second actuator 4B. Although FIG. 1 illustrates a configuration example in which three driver ECUs 2 are provided for the sake of convenience in description, the driver ECUs that drive different devices may be mixed. Furthermore, the integration ECU 1 may instruct the driver ECUs of different thresholds depending on driving targets.

The sensor ECU 3 is an electronic control unit that acquires a detected value from a sensor. Although FIG. 1 illustrates a configuration example in which three sensor ECUs 3 are provided for the sake of convenience in description, the sensor ECUs for acquiring detected values from different sensors may be mixed. Furthermore, the integration ECU 1 may instruct the sensor ECUs of different thresholds depending on detection targets.

The driver ECU 2 includes a network IF 21, a Sync detector 22, a first timer 23A, a second timer 23B, a correction section 24, a first output circuit 25A, a second output circuit 25B, a first metal, oxide semiconductor (MOS) switch 26A, and a second MOS switch 26B.

The network IF 21 transmits and receives signals (including signals instructing the ECUs of the first thresholds and the second thresholds) to and from other ECUs via the network 5. The Sync detector 22 receives the synchronization signal (Sync) from the integration ECU 1 via the network IF 21. The Sync detector 22 outputs Sync to the first timer 23A, the second timer 23B, the correction section 24, and the second output circuit 25B.

The first timer 23A is a counter that counts an 8-bit first timer value (td0[7:0]). The first timer 23A counts up the first timer value according to the internal clock (not illustrated) provided in the driver ECU 2, and resets the first timer value when Sync is received.

The correction section 24 corrects the first timer value such that the first timer value matches the count value of the reference timer 11. The correction section 24 outputs the corrected first timer value (td1[7:0]) to the first output circuit 25A and the second output circuit 25B. Examples of a method of correcting the first timer value by using the correction section 24 include the method described in PTL 1 and other appropriate methods.

The first output circuit 25A compares the corrected first timer value with the first threshold (specified by the integration ECU 1), and outputs a pulse signal when these values match. The first MOS switch 26A is controlled so as to be driven by the pulse signal. The first actuator 4A is controlled so as to be driven according to an output out) of the first MOS switch 26A.

The second timer 23B is a counter that counts a 2-bit second timer value (td20[1:0]). The second timer 23B counts up the second timer value when Sync is received, and resets the second timer value when the second timer value reaches an overflow limit.

The second output circuit 25B generates a 10-bit first concatenation timer value (td21[9:0]) by concatenating a bit string of the corrected first timer value and a bit string of the second timer value. In this case, the bit string of the second timer value is set to be the most significant bit. That is, td21[9:0]={td20[1:0], td1[7:0]}. Accordingly, the first concatenation timer value has the number of bits with which a timer value four times (=2 bits) the first timer value can be counted.

The second output circuit 25B receives the first concatenation timer value, the second threshold (thd2[9:0]) (specified by the integration ECU 1), and Sync, and outputs a pulse signal when the first concatenation timer value matches the second threshold. The second MOS switch 26B is controlled so as to be driven by the pulse signal. The second actuator 4B is controlled so as to be driven according to an output out2 of the second MOS switch 26B.

Figure 2:
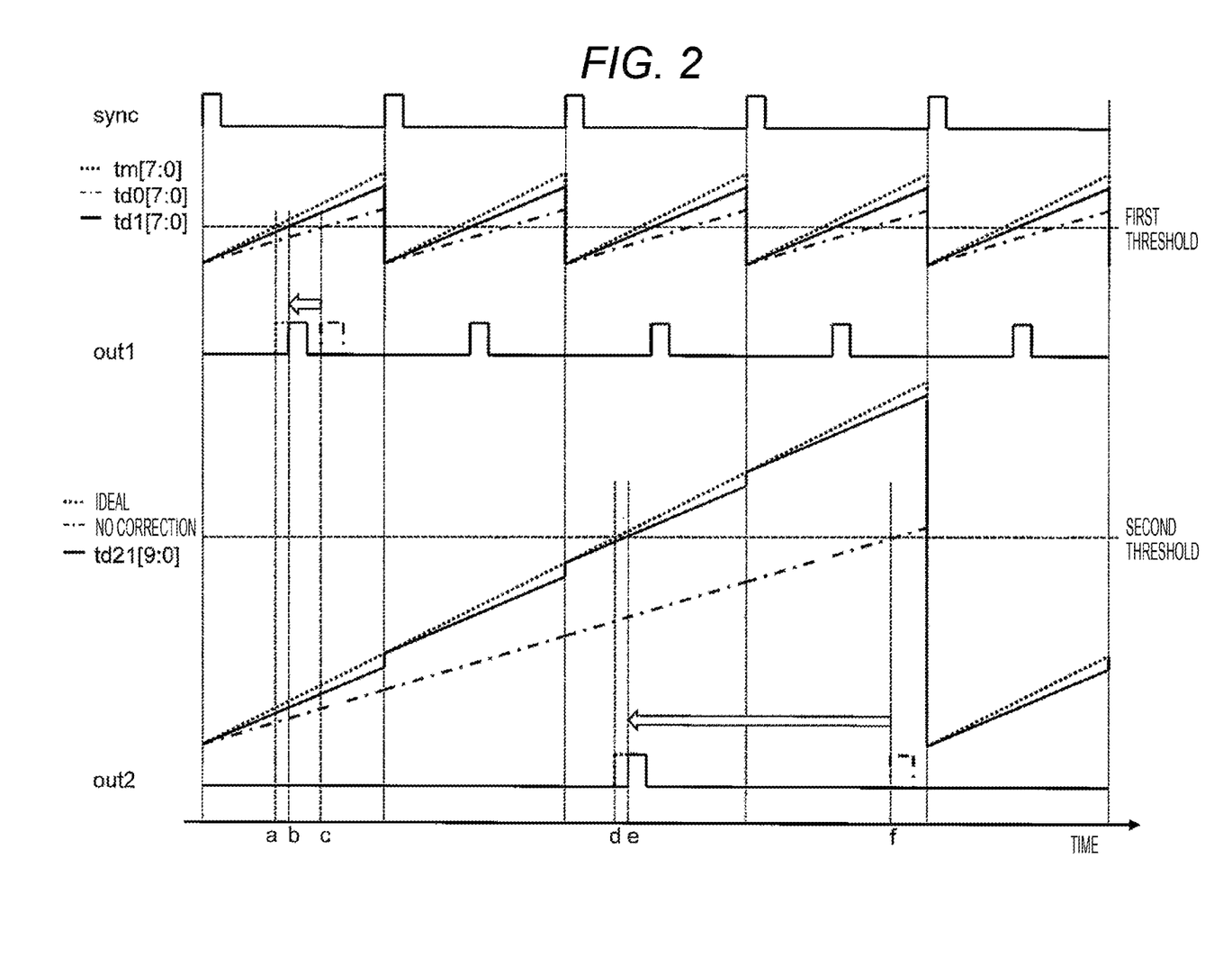
FIG. 2 is a time chart illustrating temporal variations of signals processed by a driver ECU2.

FIG. 2 is a time chart illustrating temporal variations of the signal processed by the driver ECU 2. An upper part of FIG. 2 illustrates the signals related to the first output circuit 25A, and a lower part of FIG. 2 illustrates the signals related to the second output circuit 25B. Hereinafter, the operation of the driver ECU 2 will be described with reference to FIG. 2.

The first timer value (td0[7:0]) output by the first timer 23A may be greatly deviated from the reference timer value (tm [7:0]). In a case where this value is used with no change, time c at which the first timer value matches the first threshold match is greatly deviated from time a at which the reference timer value matches the second threshold. Since the first timer value matches the first threshold at time b by using the first timer value (td1[7:0]) corrected by the correction section 24, it is possible to reduce the deviation (an arrow in the upper part of FIG. 2). Since the first timer 23A resets the first timer value by Sync regardless of the magnitude of the deviation of the first timer value, it is possible to reset the deviation between the first timer value and the first threshold at least at a point of time of Sync.

The first concatenation timer value (td21[9:0]) matches the first timer value for lower 8 bits. When the first timer value is reset by Sync, higher 2 bits of the first concatenation timer value are incremented by one. That is, since the same timer value as the first timer value is counted four times 2 bits) as the first concatenation timer value, the timer continues to count up until the second timer value reaches the overflow limit. A deviation between an ideal value based on the reference timer and an actual first concatenation timer value is forcibly reset by Sync, and these both values match at this timing.

When an uncorrected first timer value and the second timer value are concatenated, the first concatenation timer value matches the second threshold at time f. Since the ideal value matches the second threshold at time d, the deviation between these both values is large. Since the first concatenation timer value matches the second threshold at time e by concatenating the corrected first tinier value and the second timer value, it is possible to suppress the deviation from the ideal value (an arrow in the lower part of FIG. 2).

Figure 3:
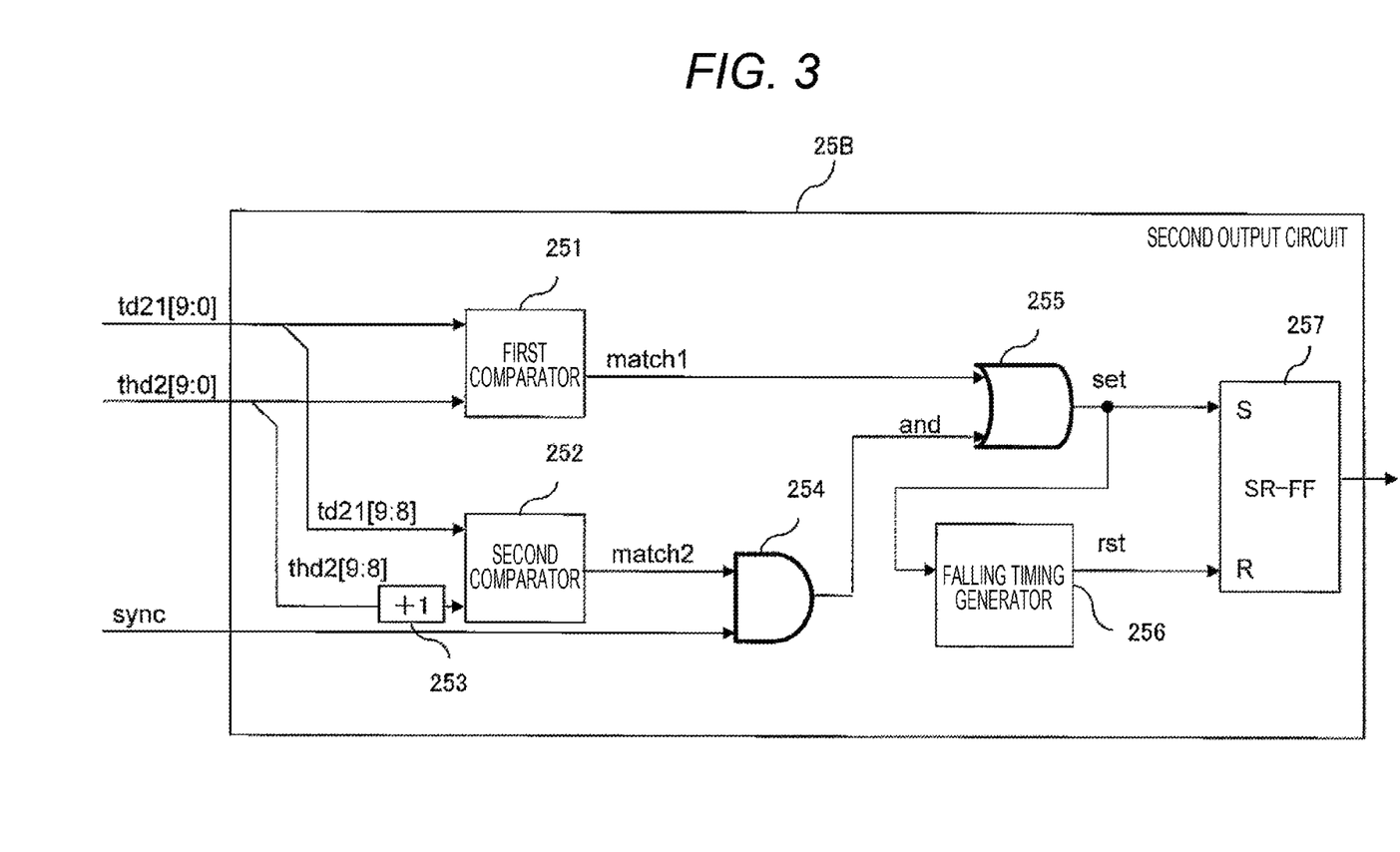
FIG. 3 is a block diagram for describing the details of a second output circuit 25B.

FIG. 3 is a block diagram for describing the details of the second output circuit 25B. A first comparator 251 compares the first concatenation timer value (td21[9:0]) with the second threshold (thd2[9:0]), and sets a first match signal (match1) to be 1 while these values match. A logical sum operator 255 outputs, as a signal set, a logical sum of the first match signal and a logical conjunction and to be described below. A falling timing generator 256 sets a signal rst to be 1 at a timing delayed from the signal set by a predetermined cycle. A storage circuit SR-FF 257 stores 1 when the signal set is to be 1, and stores 0 when the signal rst is set to be 1. The signal stored in the storage circuit SR-FF 257 becomes the output of the second output circuit 25B. Accordingly, it is possible to output the pulse signal at a point of time when the first concatenation timer value and the second threshold match.

The second comparator 252 compares the higher 2 bits (td21[9:8]) of the first concatenation timer value with a value obtained by adding 1 to higher 2 bits (thd2[9:8]) of the second threshold, and sets a second match signal (match2) to be 1 while these both values match. A logical conjunction operator 254 outputs a logical conjunction and of match 2 and Sync. The roles of the second comparator 252 and the logical conjunction operator 254 will be described again with reference to FIG. 5 described below.

Figure 4:
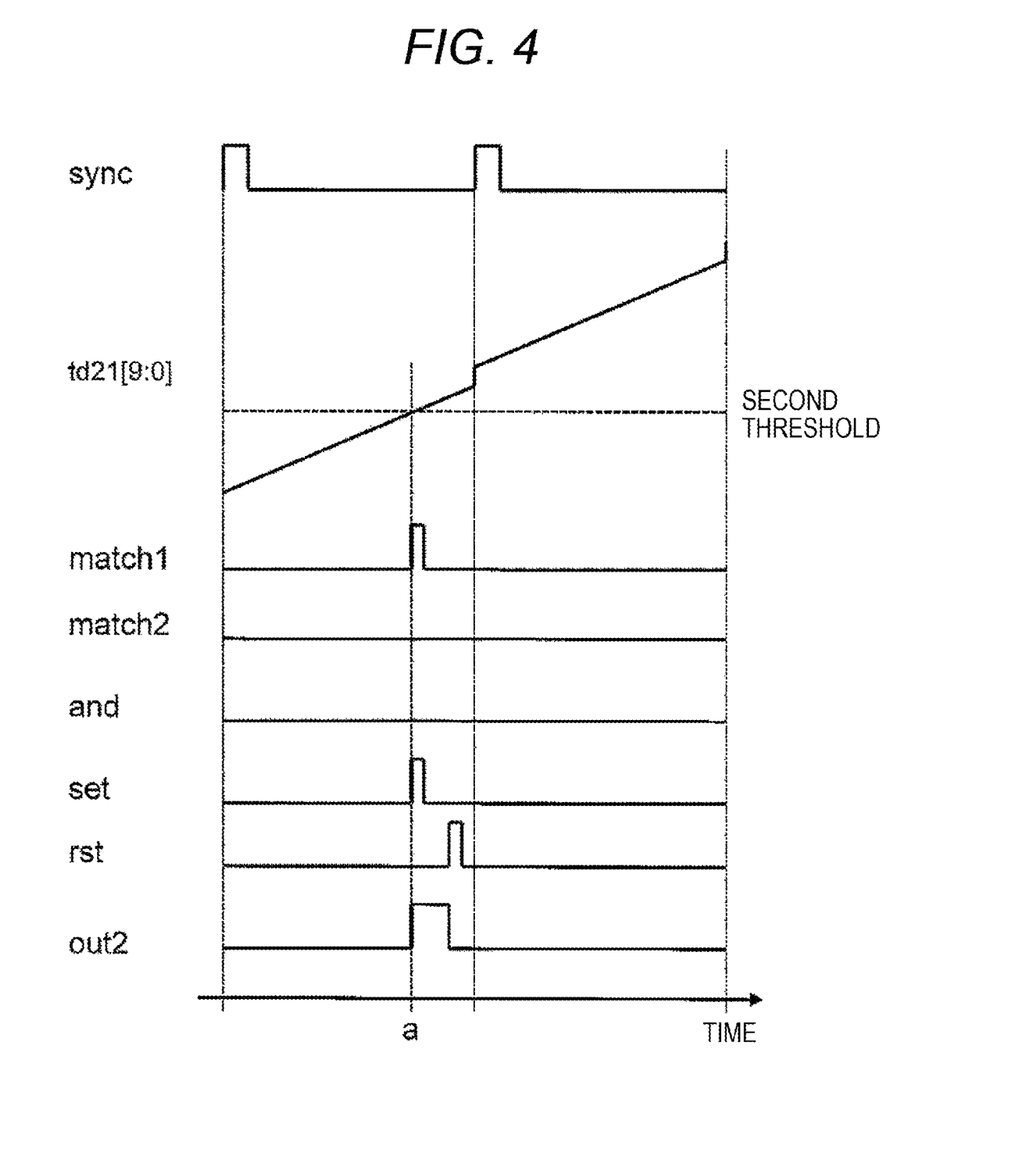
FIG. 4 is a tune chart illustrating temporal variations of signals when a first concatenation timer value (td21[9:0]) matches a second threshold.

FIG. 4 is a time chart illustrating temporal variations of the signals when the first concatenation timer value (td21 [9:0]) and the second threshold match. The first concatenation timer value matches the second threshold at time a, and the first match signal match1 becomes 1. In this case, since the signal set is also 1, the out2 is also 1. The signal rst becomes 1 at a timing delayed by a predetermined cycle, and thus, the out2 is reset. Accordingly, a one-shot pulse having a pulse width for a predetermined cycle is generated.

Figure 5:
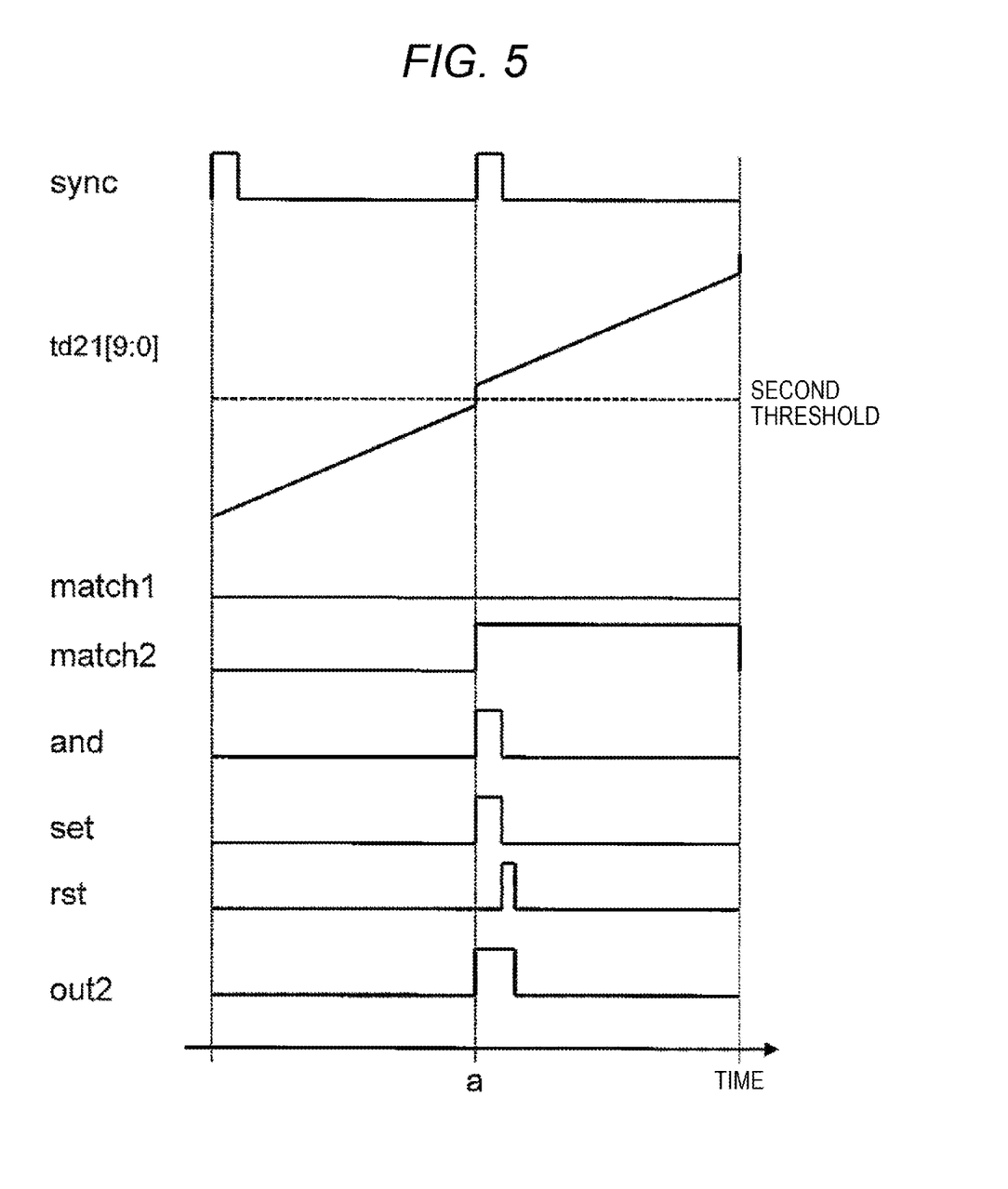
FIG. 5 is a time chart illustrating an operation example when the second threshold is set at a discontinuous point of the first concatenation timer value.

FIG. 5 is a time chart illustrating an operation example when the second threshold is set at a discontinuous point of the first concatenation timer value. The lower 8 bits of the first concatenation timer value are reset by Sync, and the higher 2 bits are counted up by Sync. Accordingly, when the lower 8 bits (=first timer value) of the first concatenation timer value are deviated from the ideal value, the first connection timer value is discontinuously counted up at a timing of Sync as illustrated in FIG. 5. When the second threshold is set to be this discontinuous point, since there is no timing at which the first concatenation timer value matches the second threshold, the first match signal (match1) does not become 1. In order to enable the out2 to be output even in such a case, the second match signal (match2) is used.

A situation illustrated in FIG. 5 occurs when the first concatenation timer value skips over the second threshold. Since this skip occurs simultaneously with Sync, in order to ascertain the situation illustrated in FIG. 5, the logical conjunction operator 254 performs the logical conjunction of Sync and match2. Since the discontinuous point in FIG. 5 is caused at a timing at which the higher 2 bits of the first concatenation timer value is counted up, a difference between the counted higher 2 bits of the first concatenation timer value and the higher 2 bits of the second threshold is necessarily 1. In other words, the value obtained by adding 1 to the higher 2 bits of the second threshold matches the higher 2 bits of the first concatenation timer value counted up by Sync. The second comparator 252 is used to ascertain this situation. Accordingly, according to the configuration illustrated in the lower part of FIG. 3, it is possible to ascertain discontinuous changes illustrated in FIG. 5, it is possible to output the out2 at least at a point of time of Sync.

Embodiment 1: Conclusion

The driver ECU 2 according to the first embodiment can synchronize the first timer value with the reference timer value with high accuracy by using the correction section 24 correcting the first timer value. Further, it is possible to generate another timer value (first connection timer value) synchronized with the reference timer value with the same accuracy as the first timer value by concatenating the second timer value as the most significant bit of the first timer value. Since it is not necessary to separately perform correction processing in order to generate the first concatenation timer value, it is possible to generate a plurality of timer values synchronized with high accuracy with a simple circuit configuration.

Embodiment 2

Figure 6:
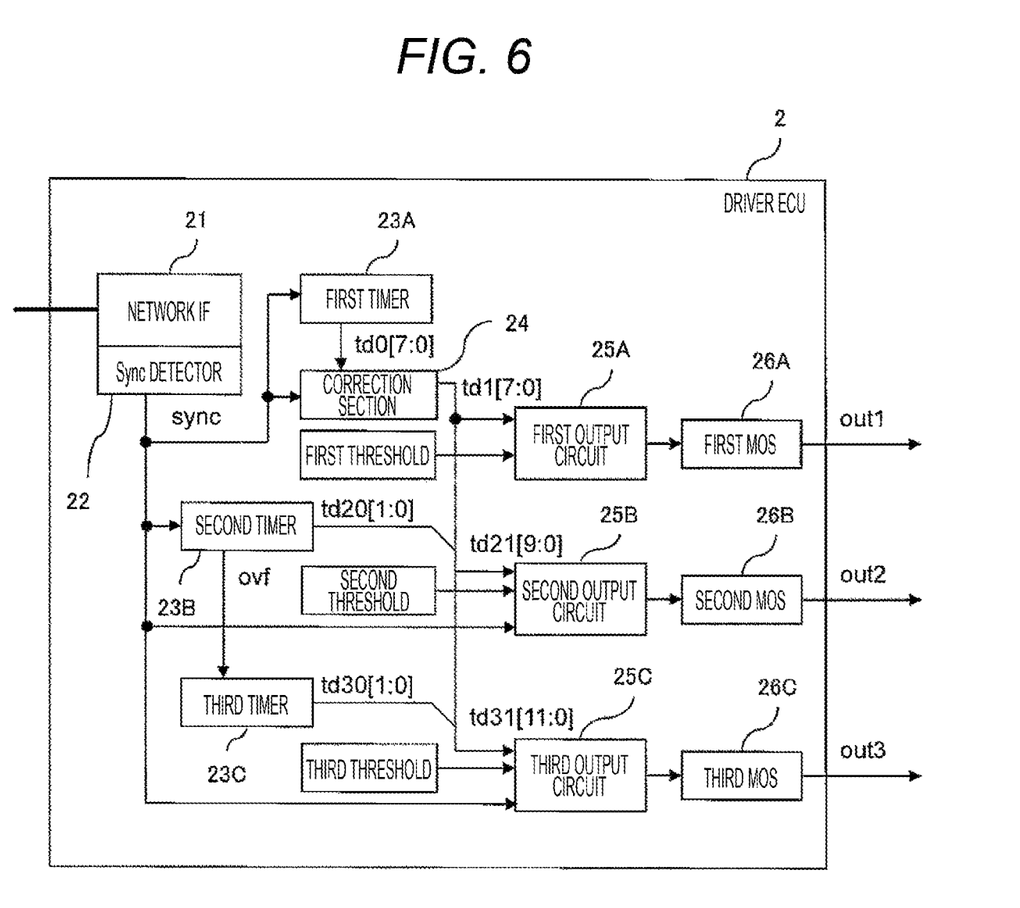
FIG. 6 is a block diagram for describing a configuration of a driver ECU 2 according to Embodiment 2.

FIG. 6 is a block diagram for describing a configuration of the driver ECU 2 according to Embodiment 2 of the present invention. The driver ECU 2 according to Embodiment 2 newly includes a third timer 23C, a third output circuit 25C, and a third MOS switch 26C in addition to the configuration described in Embodiment 1. Other configurations are substantially the same as those of Embodiment 1, and thus, differences will be Mainly described below.

The integration ECU 1 transmits the third threshold to the driver ECU 2, and the network IF 21 receives the value. The Sync detector 22 outputs Sync to the third output circuit 25C. The third timer 23C is a counter that counts a 2-bit third timer value (td30[1:0]). When a signal ovf indicating that the second timer value reaches an overflow limit, the third timer 23C counts up the third timer value, and resets the third timer value when the third timer value reaches an overflow limit.

The third output circuit 25C generates a 12-bit second concatenation timer value (td31[11:0]) by concatenating a bit string of the first concatenation timer value and a bit string of the third timer value.

In this case, the bit string of the third timer value is set to be the most significant bit. That is, td31[11:0]={td30[1:0], td21[9:0]}. Accordingly, the second concatenation timer value has the number of bits with which a timer value four times (=2 bits) the first concatenation timer value can be counted.

The third output circuit 25C has the same configuration as the second output circuit 25B. That is, the third output circuit 25C receives the second concatenation timer value, the third threshold (specified by the integration ECU 1), and Sync, and outputs a pulse signal when the second concatenation timer value matches the third threshold. The third MOS switch 26C is controlled so as to be driven by the pulse signal. The second actuator (not illustrated) is controlled so as to be driven by an output out3 of the third MOS switch 26C.

Embodiment 2: Conclusion

The driver ECU 2 according to Embodiment 2 can obtain the first and second concatenation timer values synchronized with high accuracy by using the correction section 24 correcting the first timer value as in Embodiment 1. It is possible to obtain four or more concatenation timer values by adding the same configurations to the third timer 23C, the third threshold, the third output circuit 25C, and subsequent configurations.

About Modification Examples of Present Invention

The present invention is not limited to the aforementioned embodiments, and includes various modification examples. For example, the aforementioned embodiments are described in detail in order to facilitate easy understanding of the present invention, and are not limited to necessarily include all the described components.

Although it has been described in the aforementioned embodiments that the first timer value is 8 bits and the second and third timer values are 2 bits, the number of bits of these tinier values is not limited thereto, and any bit number can be used.

Although it has been described in FIG. 3 that the falling timing generator 256 is used to generate the one-shot pulse of the predetermined cycle, the same function may be realized by another appropriate configuration. For example, a timing to reset the SR-FF 257 may be determined by comparing the timer with the threshold depending on the purpose of control.

It has been described in the above embodiment that a timing at which the driver ECU 2 outputs the pulse signal is controlled by the timer value. The same control can also be implemented in other ECUs. For example, in the sensor ECU 3, it is possible to control a timing to sample the detected value from the sensor by the timer value. In this case, each output circuit outputs a signal out for instructing the sampling timing by comparing the timer value with the threshold.

Although it has been described in the aforementioned embodiments that the reference timer 11 included in the integration ECU 1 and the first timer 23A included in the driver ECU 2 are synchronized, the same configuration can be applied to a general network system that synchronize the timers between the ECUs.

REFERENCE SIGNS LIST

1 integration ECU
2 driver ECU
21 network IF
22 Sync detector
23A first timer
23B second timer
24 correction section
25A first output circuit
259 second output circuit
26A first MOS switch
26B second MOS switch
3 sensor ECU
4A first actuator
4B second actuator
5 network
100 in-vehicle network system

The invention claimed is:

1. An electronic controller configured to output an output signal for controlling an operation of a vehicle, the controller comprising:
   a first timer configured to count up a first timer value;
   a second timer configured to count up a second timer value;
   a first output circuit configured to compare the first timer value with a first threshold; and
   a second output circuit configured to compare a first concatenated value acquired by concatenating a bit string of the second timer value to the most significant side of a bit string of the first timer value with a second threshold,
   wherein the first timer resets the first timer value when a synchronization signal for instructing that the first timer value is synchronized with a reference timer value is received,
   the second timer is configured to count up the second timer value when the synchronization signal is received,
   the first output circuit is configured to output a first output signal when the first timer value matches the first threshold, and
   the second output circuit is configured to output a second output signal when the first concatenated value matches the second threshold,
   wherein the second output circuit includes:
      a first comparator configured to output a first match signal when the first concatenated value matches the second threshold,
      a storage circuit configured to store, as the second output signal, the first match signal, and
      a reset signal generator configured to output a reset signal for resetting the second output signal stored in the storage circuit at a time later than a time when the first comparator outputs the first match signal, and
   the storage circuit is configured to output, as the second output signal, the first match signal when the first comparator outputs the first match signal.

2. The electronic controller according to claim 1,
   wherein the second output circuit further includes:
      a second comparator configured to output a second match signal when a first bit string, acquired by extracting a predetermined number of bit values in order from the most significant bit of the first concatenated value, matches a second bit string acquired by further adding 1 to a bit string acquired by extracting a predetermined number of bit values in order from the most significant bit of the second threshold, and
      a logical conjunction operator configured to output a signal indicating that a logical conjunction of the second match signal and the synchronization signal is true when the logical conjunction is true,
   the predetermined number is the number of bit values of the second timer, and
   the storage circuit is configured to store, as the second output signal, a signal indicating a true value when the logical conjunction operator outputs the signal.

3. The electronic controller according to claim 2,
   wherein the second output circuit further includes:
      a logical sum operator configured to output a logical sum of the first match signal and the output of the logical conjunction operator, and the storage circuit is configured to store, as the second output signal, the output of the logical sum operator.

4. The electronic controller according to claim 1, wherein the second timer is configured to reset the second timer value when the second timer value reaches an overflow limit.

5. The electronic controller according to claim 1, further comprising:
   a correction section configured to correct the first timer value such that a count value of a timer included in an output configured to output the synchronization signal matches the first timer value.

6. An electronic controller configured to output an output signal for controlling an operation of a vehicle, the controller comprising:
   a first timer configured to count up a first timer value;
   a second timer configured to count up a second timer value;
   a first output circuit configured to compare the first timer value with a first threshold;
   a second output circuit configured to compare a first concatenated value acquired by concatenating a bit string of the second timer value to the most significant side of a bit string of the first timer value with a second threshold,
   wherein the first timer resets the first timer value when a synchronization signal for instructing that the first timer value is synchronized with a reference timer value is received,
   the second timer is configured to count up the second timer value when the synchronization signal is received,
   the first output circuit is configured to output a first output signal when the first timer value matches the first threshold, and
   the second output circuit is configured to output a second output signal when the first concatenated value matches the second threshold;
   a third timer configured to count up a third timer value; and
   a third output circuit configured to compare a second concatenated value acquired by concatenating a bit string of the third timer value to the most significant side of a bit string of the first concatenated value with a third threshold,
   wherein the third output circuit outputs a third output signal when the second concatenated value matches the third threshold.

7. The electronic control unit according to claim 6, wherein the third timer is configured to count up the third timer value when the second timer value reaches an overflow limit, and
   the third timer is configured to reset the third timer value when the third timer value reaches an overflow limit.

* * * * *